July 22, 1952  J. M. MARZOLF  2,604,511
CIRCUIT FOR MEASURING INDUCTANCE OR CAPACITANCE
Filed March 2, 1950
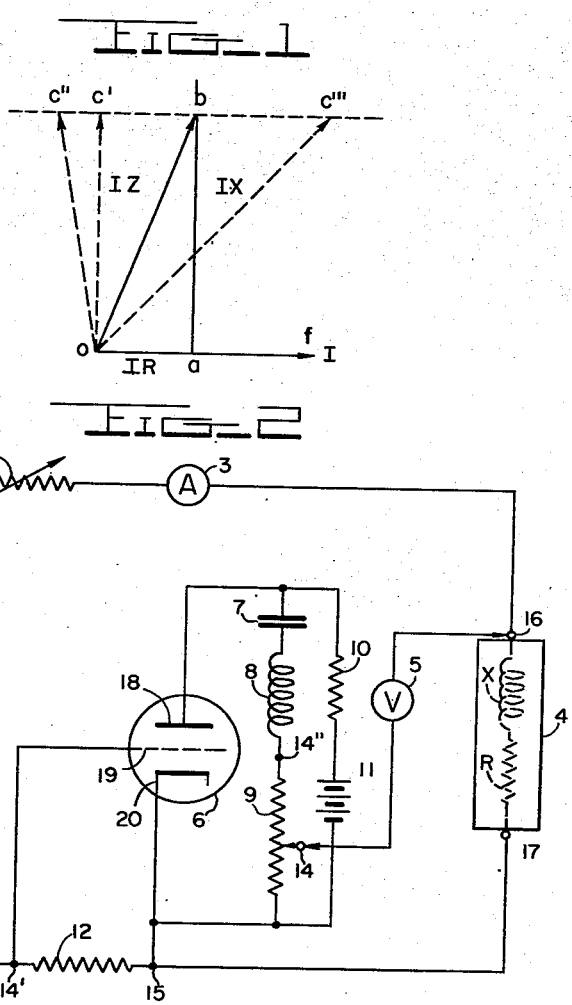
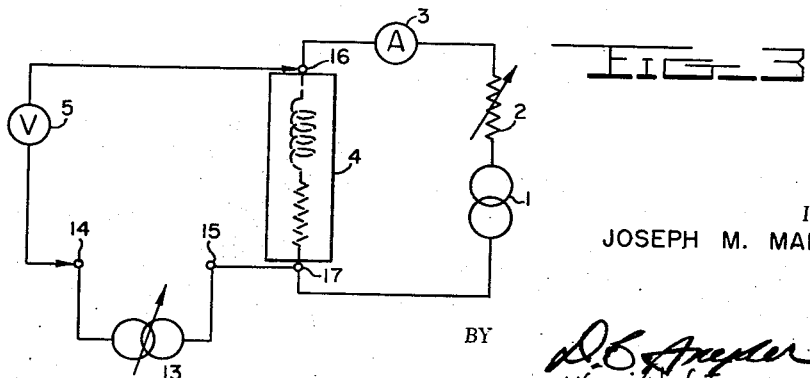
INVENTOR
JOSEPH M. MARZOLF
BY
ATTORNEYS Patented July 22, 1952

2,604,511

UNITED STATES PATENT OFFICE 2,604,511

CIRCUIT FOR MEASURING INDUCTANCE OR CAPACITANCE

Joseph M. Marzolf, Washington, D. C.

Application March 2, 1950, Serial No. 147,312

13 Claims. (Cl. 175—183)

(Granted under the act of March 3, 1883, as amended April 30, 1928; 370 O. G. 757)

This invention relates to a method and apparatus for measuring the reactive component of a complex impedance, and in particular to a method and apparatus for measuring inductance and capacitance.

More particularly this invention relates to a method and apparatus for measuring the inductance or capacitance of a complex network which includes resistive components in addition to the reactive components.

This invention also relates to a method and apparatus for measuring the voltage drop across only the reactive component of an impedance which includes both reactive and resistive components.

In the measurement of inductance in particular and also certain capacitive loads, the finite resistance associated with the inductive or capacitive impedance cannot be separated physically from the reactance of the impedance and cannot often be neglected. This problem exists when it is necessary to measure the voltage drop across just the reactive components of an unknown impedance which includes a resistive component.

One object of this invention is therefore to provide a simple method and apparatus for quickly measuring the inductance and capacitance components of an unknown complex impedance.

Another object of this invention is to provide a simple method and apparatus for quickly measuring the inductance or capacitance of an unknown complex network which includes an appreciable resistive component.

Still another object of this invention is to provide a simple method and apparatus for quickly measuring only the reactive voltage drop across the reactive component of an unknown impedance which includes a resistive component.

In the drawings:

Fig. 1 is a vector diagram illustrating the principles underlying the present method used in measuring the inductance, capacitance, or voltage drop across the reactive portion of an unknown impedance.

Fig. 2 is a simplified diagram indicating generally one form of apparatus which can perform the method illustrated by Fig. 1.

Fig. 3 is a schematic diagram of one specific form of apparatus used in measuring the voltage drop across the reactive component of the unknown impedance.

One common method of measuring the inductance or capacitance of an unknown impedance which includes an appreciable resistance component is by means of a Wheatstone bridge. Anyone who has ever operated such a device knows that in using such apparatus the measurement is very cumbersome since the bridge must be balanced by a cut and try method since two quantities must be simultaneously varied to achieve a balance. These quantities are the resistive and reactive impedance standards forming the known leg of the bridge.

The present invention and apparatus requires only the variation of a single quantity and consequently the measurement of any capacitance or inductance which includes a resistive component is greatly simplified.

In the measuring of the voltage drop across the reactive component of an unknown impedance which includes a resistive component, previous apparatus and methods required independent measurement of voltage, current, and also the power consumed by the impedance. This obviously required the use of voltage and current measuring apparatus as well as expensive power indicating apparatus. Even then, further mathematical calculations were required after these various independent measurements were taken. Of course when the voltage drop across the reactive parts of the impedance is known, a measurement of frequency and another calculation would give the value of the inductance or capacitance.

The present invention greatly simplifies the method and apparatus for obtaining this reactive voltage and requires only, a source of excitation providing a known current flow through the unknown impedance, a single voltmeter, and a voltage which is equal to, and 180 degrees out of phase with, the resistive voltage drop across the unknown impedance. The magnitude of the reactive voltage is obtained by adding the latter voltage to the voltage across the unknown impedance which in effect cancels out the resistive component voltage.

No calculations are necessary, and no current or power measurements are necessary. The value of the inductance or capacitance is determined directly from a measurement of this reactive voltage, and this method enables one to calibrate the voltmeter directly in units of capacitance or inductance, for a given voltage source and current flow through the unknown impedance. In contrast, deriving the inductance or capacitance from the prior art voltage measuring method previously mentioned is not simply done by calibrating a voltmeter, because with such prior methods no voltmeter directly reads the reactive voltage drop to the exclusion of the resistive voltage drop but rather a mathematical calculation is necessary to derive the reactive voltage drop. (Of course this could be done by expensive and complicated calculators but it is assumed that this is not practically or economically feasible.)

Various methods of calibrating the voltmeter will be later explained, but first the method of simply measuring the reactive voltage drop will be explained.

Referring to Figures 1 and 3, a substantially pure sine wave voltage source 1 is connected to the unknown complex impedance 4 by way of terminals 16—17. The voltage drop across the impedance 4 may be measured by a conventional voltmeter 5 and is represented by vector $ob$. The voltage across the inductive reactance is represented by vector $ab$ and the voltage drop across the resistive component of the impedance 4 is represented by vector $oa$ which is in phase with the current vector $of$. If a voltage $bc'$ is added by generator 13 to the voltage $ob$ across the unknown impedance which is equal to and 180 degrees out of phase with, the voltage drop $oa$ across the resistive component of the impedance 4, the net voltage $oc'$ will be equal to the reactive voltage drop $ab$.

Since the value of the resistive component of the unknown impedance is not known, there is a problem in obtaining an indication of when voltage $bc'$ is equal to and opposite in phase with resistive voltage $oa$ (or current $of$). To determine if the voltage component introduced by generator 13 is substantially equal to and opposite in phase with the IR drop through the resistance component of impedance 4 the variation in voltmeter readings indicated by meter 5 must be observed with variations in the amplitude and the phase of the signal introduced by source 13. To explicate, reference is again made to Fig. 1, where the voltage from source 13 appearing across terminals 14—15 is represented in magnitude by the length of vectors $bc''$ or $bc'''$. If terminal 15 of source 13 is connected to the impedance terminal 17 in such a manner that the voltage from source 13 is in time phase with resistive voltage component $oa$, then voltmeter 5 will be measuring the magnitude of vector $oc'''$. But, if the voltage from source 13 is in phase opposition with the resistive voltage component $oa$, voltmeter 5 will be measuring the magnitude of vector $oc''$. It is clear from Figure 1 that $oc''$ is smaller in length than vector $oc'''$. Now, if the magnitude of vector $bc''$, which is the magnitude of the voltage from source 13, is varied until voltmeter 5 reads a minimum, then the voltage measured by voltmeter 5 at that point is the voltage represented by vector $oc'$, which is equal in magnitude and phase to the reactive voltage drop $ab$.

The voltage measuring method of this invention has more general application in measuring the actual value of an unknown inductance or capacitance which has appreciable inherent resistance. For this purpose, the voltmeter must be calibrated directly in units of inductance and capacitance. Any one given calibration is only accurate for one current and one frequency $f$. However, the range of the meter can be extended by changing the frequency or current used with any new calibration of the voltmeter. For this application, it is well to use a crystal controlled oscillator for source 1 which generates a substantially pure sine wave. Also an ammeter 3 is necessary to measure current, and some means, such as variable resistance 2, is required to adjust the current I to the same value regardless of the value of the unknown impedance 4. To improve the ease of setting ammeter 3, resistance 2 can be some type of constant-current regulator to adjust the current I automatically to some constant pre-selected value. Of course knowing the frequency $f$, the current I, and the reactive voltage as read on the scale of voltmeter 5, the scale can be calibrated directly in henries or farads from the basic equations—

$$IX = I(2\pi f L)$$
$$IX = I\left(\frac{1}{2\pi f C}\right)$$

where $I$ = current in amps
$IX$ = reactive voltage drop in volts
$\pi$ = 3.14159
$f$ = frequency in cycles
$L$ = inductance in henries
$C$ = Capacitance in farads Another way to calibrate the voltmeter scale where the frequency $f$ and current I as to actual magnitude need not be known, but only that I and $f$ remains constant for any one given calibration, is by use of a single standard or known capacitance C1 and a known inductance L1. The scale of voltmeter 5 can be thus calibrated by the use of the following equations—

$$\frac{IX1}{IX2} = \frac{V1}{V2} = \frac{C2}{C1}$$

$$\frac{IX1}{IX2} = \frac{V1}{V2} = \frac{L1}{L2}$$

where L2 and C2 are respectively the inductance and capacitance readings for reactive voltages V2 read on voltmeter 5, and V1 is the voltmeter reading when the known inductance or capacitance is measured.

Thus far, no particular apparatus has been disclosed for source 13 in Figure 3. As previously stated, one requirement for this source is that it must be either in phase, or 180 degrees out of phase, with resistive voltage $oa$. Then, by a reversal of terminal connections for the in phase condition, a 180 degree phase relation can be obtained. One way to obtain a voltage in phase with the resistive voltage $oa$ is to obtain a voltage which is in phase with the current I since $oa$ is always in phase with the current I. The voltage across a pure resistance is in phase with the current flowing through it so, in Figure 2, since the same current flows through resistance 12 as does through the unknown impedance 4, the voltage across terminals 14' and 15 is in time phase with the voltage drop across the resistive component of impedance 4. Since terminal 15 is already connected to terminal 17 a phase inversion circuit is necessary to obtain a voltage which is 180 degrees out of phase with the resistive voltage $oa$. Figure 2 discloses an electron tube as a phase inverter, but it is clear that other phase inversion means can be used as for example a transformer circuit or a Wheatstone bridge circuit. The electron tube means is the preferred embodiment since it is the simplest and most inexpensive means.

As is well known, the voltage between the cathode and plate electrodes of a resistance loaded linear amplifier circuit is 180 degrees out of time phase with the voltage applied between the cathode and grid electrode. Thus in Figure 2, vacuum tube 6 has its grid and cathode electrodes respectively connected to terminal 14' and 15 of resistance 12 which is in series with unknown impedance 4 and voltage source 1. Resistance 10 is connected to plate and direct current power source 11 connects between the resistance 10 to cathode 20. The bias on tube 6 is preferably adjusted so that it operates on the linear portion of the curve so that voltmeter 5 connected between terminals 14 and 16 measures only pure sine wave voltages. Otherwise an error in measurement results. Connected in parallel circuit relation to tube 6 is another substantially pure resistive load circuit comprising capacitance 7 which is a direct current blocking means so that voltmeter 5 measures only the alternating current voltage across resistance 9, and an inductance 8 which nullifies any phase changing effect of capacitance 7. Of course if resistance 9 is substantially greater than the capacitive reactance of capacitance 7 then inductance 8 is not necessary. Resistance 9 is a potentiometer so that by varying the connection point between terminal 14 and resistance 9, the magnitude of the voltage appearing across terminals 14 and 15 is varied. Another possible variation of the circuit of Figure 2 is made by omitting resistance 9 altogether and making resistance 12 variable so that the voltage coupled by capacitance 7 to voltmeter 5 is variable in magnitude. In such an embodiment, voltmeter 5 would be connected to point 14″. If the voltmeter scale is calibrated taking the direct current voltage at plate of tube 6 into consideration, then condenser 7 and inductance 8 could be omitted altogether and the voltmeter 5 connected directly to the plate circuit of tube 6.

It is to be noted that in the embodiment of Figure 2 and its modifications that when terminal 15 is connected to terminal 17, the voltage across terminals 14 and 15 (or 14″ and 15) is so related to the voltage across impedance 4 that it will always be in 180 degree phase opposition to the resistive voltage drop in impedance 4.

The steps to follow in using the apparatus of Figure 2 are as follows assuming the meter is calibrated for a known current $I_1$ and a frequency $f_1$: with source 1 delivering a sine wave of voltage at frequency $f_1$, resistance 2 is adjusted so that ammeter 3 reads $I_1$ amps; then adjusting potentiometer 9 so that voltmeter 5 reads a minimum, voltmeter 5 will now give the inductance or capacitance of impedance 4.

For some purposes, it may be necessary to measure only relative values of reactance. Such a situation is present in inductance or capacitive liquid level indicators where only the reactive component of a complex impedance is varied with the level of a liquid. Here the relationship between the liquid level and the reactance change is known, so that by keeping the current constant, the change in voltage reading is proportional to the change in inductive or capacitive reactance so that the liquid level can also be read directly from the voltmeter reading.

It is to be noted that this invention also has utility in measuring the resistance of the unknown complex impedance. If a second voltmeter is placed across terminals 14 and 15 in Figure 2 or 3 and the apparatus adjusted to measure the reactance as before explained, since the voltage introduced across these terminals is then equal to the resistive voltage drop in the unknown complex impedance, knowing the current I will give the value of the resistance of the unknown complex impedance. Of course, this second voltmeter can be calibrated directly in ohms for any given current I. Thus with the movement of a single control knob (that is the knob which varies the magnitude of the voltage across terminals 14 and 15) simultaneous measurement of both resistance and inductance or capacitance of the unknown complex impedance is quickly and easily obtained.

In all the foregoing applications and circuits it is obvious that the impedance of voltmeter 5 must be substantially greater than the circuit across which it is placed so that it will not have any effect on the circuit and cause measurement errors. The embodiments thus far disclosed are exemplary only and, except for the limitations of the claims, various modifications can be made without varying from the scope of the invention.

The invention described herein may be manufactured and used by or for the Government of the United States of America for governmental purposes without the payment of any royalties thereon or therefor.

What is claimed is:

1. The method of obtaining the voltage drop across the reactive component of a complex unknown impedance which includes a resistive component comprising the steps of: causing a sine wave of current I to flow through said unknown impedance; obtaining a variable voltage V′ across two given terminal points which is 180 degrees out of phase with the current I; connecting one of the said terminal points to the impedance terminal which will give the smallest voltage reading on a relatively high resistance voltmeter placed between the other terminal point and the impedance terminal which has not been connected to said one terminal point; varying the magnitude of V′ so that the reading V is a minimum, the latter voltage reading being the voltage drop across the reactive component of the impedance.

2. The method of obtaining the voltage drop across the reactive component of a complex unknown impedance which includes a resistive component comprising the steps of: causing a sine wave of current I to flow through the unknown impedance and a resistance R connected in series circuit relation; obtaining a voltage V′ across two terminal points which is 180 degrees out of phase with the voltage across resistance R; connecting one of the said terminal points to the impedance terminal which will give the smallest voltage reading V on a relatively high resistance voltmeter placed between the other terminal point and the impedance terminal which has not been connected to said one terminal point; varying the magnitude of V′ so that the reading V is a minimum, the latter voltage reading being the voltage drop across the reactive component of the impedance.

3. The method of measuring the capacitance or inductance of an unknown complex impedance comprising the steps of: calibrating a voltmeter scale in units of measure for capacitance and inductance from data of a given current I and frequency $f$; causing a sine wave of current I at said frequency $f$ to flow through said unknown impedance; obtaining a variable voltage V′ across two given terminal points which is 180 degrees out of phase with the current I; connecting one of said terminal points to the impedance terminal which will give the smallest voltage reading V on said voltmeter when it is placed between the other terminal point and the impedance terminal which has not been connected to said one terminal point; varying the magnitude of V' so that the reading V is a minimum.

4. The method of measuring the capacitance or inductance of an unknown impedance comprising the steps of: calibrating a voltmeter scale in units of measure for capacitance and inductance from data of a given current I and frequency F; causing a sine wave of current to flow through the unknown impedance and a resistance R connected in series circuit relation; obtaining a voltage across two terminal points which is 180 degrees out of phase with the voltage across resistance R; connecting one of said terminal points to the impedance terminal which will give the smallest voltage reading V on said voltmeter when it is placed between the other terminal point and the impedance terminal which has not been connected to said one terminal point; varying the magnitude of V' so that the reading V is a minimum.

5. Apparatus for measuring the inductance or capacitance of an unknown impedance which includes a resistive component comprising the combination of a first pair of connecting terminals across which the unknown impedance is to be placed, a first substantially pure resistance connected to one of said terminals, a source of a sine wave of voltage at a fixed frequency coupled between the other connecting terminal and the unconnected terminal of said first resistance, said source of voltage including a first means for varying the magnitude of current which will flow through the unknown impedance which will be of a predetermined magnitude, regardless of the value of said impedance, a second means coupled to said first resistance for developing across a second pair of connecting terminals a voltage which is 180 degrees out of phase with the voltage across said first resistance, a third means for coupling one of said second pair of connecting terminals to one of said first pair of connecting terminals so that the voltage developed by said second means will oppose the voltage drop across the resistive component of said unkown impedance, a voltmeter connected between the other terminal of said second pair of connecting terminals and the terminal of said first pair of connecting terminals which has not been connected to said second pair of connecting terminals, a fourth means associated with said second means for adjusting the magnitude of the voltage across said second pair of connecting terminals so that said voltmeter will indicate a minimum voltage, said voltmeter indication being a measure of the reactive impedance of said unknown impedance.

6. Apparatus for measuring the inductance or capacitance of an unknown impedance which includes a resistive component comprising the combination of a first pair of connecting terminals across which the unknown impedance is to be placed, a first substantially pure resistance coupled to one of said terminals, a source of a sine wave of voltage at a constant frequency coupled between the other connecting terminal and the unconnected terminal of said first resistance, said source of voltage including a first means for varying same so that the magnitude of current which will flow through the unknown impedance will be the same regardless of the value of said impedance, an electron conduction device having an anode, cathode and control electrode, a second substantially pure resistance connected to said anode and being in series circuit relation with a source of direct current voltage and the said cathode electrode, a third substantially pure resistance load in parallel circuit relation to said conduction device, said cathode coupled to the terminal of said first resistance which is coupled to one of said connecting terminals, said control electrode coupled to the other terminal of said first resistance, a voltmeter coupled between said third resistance and the one of said first pair of connecting terminals not connected to said first resistance, a second means associated with said electron conduction device for adjusting the magnitude of voltage coupled from said third resistance to said voltmeter so that said voltmeter will indicate a minimum voltage, said voltmeter indication being a measure of the voltage drop across the reactive component of said unknown impedance.

7. Apparatus for measuring the inductance or capacitance of an unknown impedance which includes a resistive component comprising the combination of a first pair of connecting terminals across which the unknown impedance is to be placed, a first substantially pure resistance connected to one of said terminals, a source of a sine wave of voltage at a constant frequency coupled between the other connecting terminal and the unconnected terminal of said first resistance, said source of voltage including a first means for varying the magnitude of same so that the magnitude of current which will flow through the unknown impedance will be the same regardless of the value of said impedance, an electron conduction device having an anode, cathode and control electrode, a second substantially pure resistance connected to said anode and being in series circuit relation with a source of direct current voltage and cathode electrodes, a third substantially pure resistance load which includes a direct current blocking means in parallel circuit relation to said conduction device, said cathode coupled to the terminal of said first resistance which is coupled to one of said connecting terminals, said control electrode coupled to the other terminal of said first resistance, a voltmeter coupled between said third resistance and the one of said first pair of connecting terminals not connected to said first resistance, a second means associated with said electron conduction device for adjusting the magnitude of voltage coupled from said third resistance to said voltmeter so that said voltmeter will indicate a minimum voltage, said voltmeter indication being a measure of the voltage drop across the reactive component of said unknown impedance.

8. The combination of a first pair of connecting terminals across which an unknown impedance is to be placed, a first substantially pure resistance coupled to one of said terminals, a source of a sine wave of voltage coupled between the other connecting terminal and the unconnected terminal of said first resistance, an electron conduction device having an anode, cathode, and control electrode, a second substantially pure resistance connected to said anode and being in a series circuit relation with a source of direct current voltage and the said cathode electrode, said cathode coupled to the terminal of said first resistance which is coupled to one of said connecting terminals, said control electrode coupled to the other terminal of said first resistance, a voltmeter having one terminal coupled to said second resistance at a point remote from the point at which said second resistance connects with said source of direct current voltage, the other terminal of said voltmeter coupled to the one of the said first pair of connecting terminals which is not coupled to said first resistance, means associated with said electron conduction device for adjusting the magnitude of voltage coupled to said voltmeter from the plate circuit of said electron conduction device so that voltmeter will indicate a minimum voltage, said minimum voltage being a measure of the value of the voltage drop across the reactive component of said unknown impedance.

9. Apparatus for use in measuring the inductance or capacitance of an unknown impedance which includes a resistive component comprising the combination of a first source of alternating current voltage of stable frequency, a first pair of connecting terminals, across which the unknown impedance is to be placed, coupled to said first source of voltage, a first means coupled to said first pair of connecting terminals for developing across a pair of output connecting terminals a voltage which is 180 degrees out of phase with the current which will flow through said unknown impedance, a second means for coupling one of said output connecting terminals to one of said first pair of connecting terminals so that the voltage developed by said first means will oppose the voltage drop across the resistive component of said unknown impedance, a voltmeter connected between the other terminal of said output connecting terminals and the terminal of said first pair of connecting terminals which has not been connected to said output connecting terminals, a third means associated with said second means for adjusting the magnitude of the voltage across said output connecting terminals so that the voltmeter will indicate a minimum voltage, said voltmeter indication being a measure of the reactive impedance of said unknown impedance.

10. Apparatus for use in measuring the inductance or capacitance of an unknown impedance which includes a resistive component comprising the combination of a first source of alternating current voltage of stable frequency, means coupling said unknown impedance to said source of alternating current voltage to produce a current flow therethrough, a voltmeter connected to measure the voltage drop across said unknown impedance, a second source of alternating current voltage having a phase opposite to the current flow through said unknown impedance coupled to said voltmeter to oppose the resistive voltage drop measured thereby and means for adjusting the amplitude of the voltage from said second source to minimize the reading of said voltmeter, said voltmeter indication being a measure of the reactive impedance of said unknown impedance.

11. Apparatus for use in measuring the inductance or capacitance of an unknown impedance which includes a resistive component comprising the combination of a first source of alternating current voltage of stable frequency, an unknown impedance coupled to said first voltage source, a first pair of terminals coupled to said unknown impedance so that the voltage across said terminals is equal in magnitude and phase to the voltage across said unknown impedance, a second pair of terminals, a second source of alternating current voltage connected to said second pair of terminals which develop a voltage across said second pair of terminals which is 180 degrees out of phase with the current which flows through said unknown impedance, means for coupling one of said second pair of terminals to one of said first pair of terminals so that the voltage developed by said second voltage source will oppose the voltage drop across the resistive component of said unknown impedance, a voltage measuring device connected between the other terminal of said second pair of terminals and the terminal of said first pair of terminals which has not been connected to said second pair of terminals, means associated with said second voltage source for adjusting the magnitude of the voltage across said second pair of terminals so that the voltage measuring device will indicate a minimum voltage.

12. The combination comprising a first voltage generating means for developing a sine wave of voltage, a first pair of terminals across which an unknown impedance having resistive and reactive components is to be placed, said first means being in series circuit relation with said first pair of terminals, a voltmeter and a second voltage generating means coupled across said first pair of terminals, said second voltage generating means generating a voltage which is opposite in phase to the voltage developed across one of the impedance components of said unknown impedance, means coupled to one of said voltage generating means for adjusting the amplitude of the output of same to a value giving a minimum indication on said voltmeter whereby the voltage indicated thereby is a measure of the other impedance component of said unknown impedance.

13. Apparatus for use in measuring the capacitance or inductance of an unknown complex impedance comprising a series circuit comprising an alternating current voltage source of substantially constant current characteristic, first and second terminals to which the unknown impedance is adapted to be coupled, a second circuit parallel to said unknown impedance for applying thereacross a voltage opposite in phase to that supplied by said source, said second circuit comprising a variable potential sampling means having at least a pair of terminals, one terminal of which is connected to one side of said unknown impedance, and a high resistance voltmeter serially connected between the other terminal of said potential sampling means and the other side of said unknown impedance.

JOSEPH M. MARZOLF.

REFERENCES CITED

The following references are of record in the file of this patent:

UNITED STATES PATENTS

| Number | Name | Date |
| --- | --- | --- |
| 1,931,460 | Lilienfeld | Oct. 17, 1933 |
| 2,273,066 | Povey | Feb. 17, 1942 |
| 2,329,098 | Browning et al. | Sept. 7, 1943 |
| 2,557,798 | Reitz, Jr. | June 19, 1951 |

FOREIGN PATENTS

| Number | Country | Date |
| --- | --- | --- |
| 451,094 | Great Britain | July 29, 1936 |